United States Patent
Kubo et al.

(10) Patent No.: US 9,131,521 B2
(45) Date of Patent: Sep. 8, 2015

(54) COMMUNICATIONS APPARATUS TRANSMITTING DATA ON CHANNELS ADAPTIVELY SWITCHABLE

(75) Inventors: Yuki Kubo, Osaka (JP); Masanori Nozaki, Osaka (JP); Kentarou Yanagihara, Hyogo (JP); Hiroshi Nishimura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 376 days.

(21) Appl. No.: 13/484,313

(22) Filed: May 31, 2012

(65) Prior Publication Data

US 2013/0070648 A1 Mar. 21, 2013

(30) Foreign Application Priority Data

Sep. 21, 2011 (JP) ................................ 2011-206303

(51) Int. Cl.
| | |
|---|---|
| *H04J 3/16* | (2006.01) |
| *H04W 72/12* | (2009.01) |
| *H04W 84/18* | (2009.01) |
| *H04W 28/06* | (2009.01) |
| *H04L 1/18* | (2006.01) |
| *H04W 72/04* | (2009.01) |

(52) U.S. Cl.
CPC ......... *H04W 72/1257* (2013.01); *H04L 1/1867* (2013.01); *H04W 28/06* (2013.01); *H04W 72/0446* (2013.01); *H04W 84/18* (2013.01)

(58) Field of Classification Search
CPC ..... H04L 12/5695; H04L 47/10; H04L 47/15; H04J 3/1682; H04Q 11/0478
USPC .................................................. 370/468, 477
See application file for complete search history.

(56) References Cited

U.S. PATENT DOCUMENTS

| | | | | |
|---|---|---|---|---|
| 2003/0152054 A1* | 8/2003 | Hirano et al. | ................. | 370/338 |
| 2006/0252449 A1* | 11/2006 | Ramesh | ........................ | 455/522 |
| 2011/0249126 A1* | 10/2011 | Nakamura et al. | ............ | 348/180 |
| 2011/0280119 A1* | 11/2011 | Bianconi et al. | .............. | 370/217 |

FOREIGN PATENT DOCUMENTS

JP 2005-277599 A 10/2005

OTHER PUBLICATIONS

Yosuke Tanigawa et al., "Multi-Channel MAC Protocols Pursuing Aggressive Use of Vacant Resources", The Institute of Electronics, Information and Communication Engineers (IEICE), 2009, IEICE Transactions B, vol. J92-B, No. 1, pp. 196-206.
Japanese Office Action with translation mailed Feb. 10, 2015.

* cited by examiner

*Primary Examiner* — Mang Yeung
(74) *Attorney, Agent, or Firm* — Rabin & Berdo, P.C.

(57) ABSTRACT

In a communications apparatus, a communication controller transmits and receives signals on any of plural channels. A channel switching controller is responsive to channel switching information selectively defining plural reception-waiting periods using the channels to alter a channel to be used by the communication controller. A neighboring node channel controller exchanges channel switching information with other nodes to manage the channel switching information received from the other nodes. When transmitting transmission signals, a transmission controller refers to the channel switching information of the other nodes, and controls repetitive transmission of the transmission signals on the channel thus searched for.

4 Claims, 15 Drawing Sheets

FIG. 4
| NODE | CHANNEL B | 41 |
|---|---|---|
| 1 | ch1 | |
| 2 | ch2 | |
| 3 | ch3 | |
| ... | ... | |
FIG. 5A
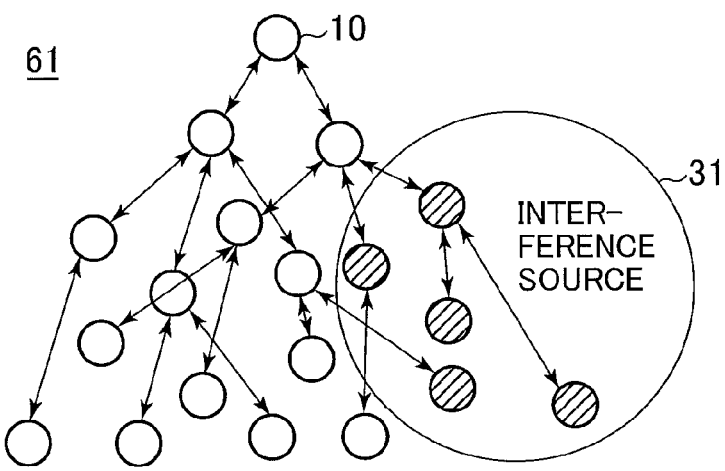
FIG. 5B
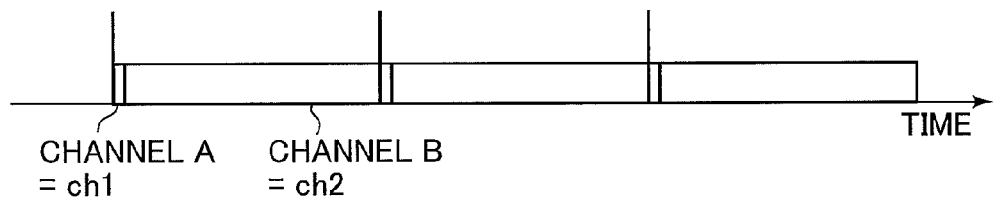
FIG. 5C
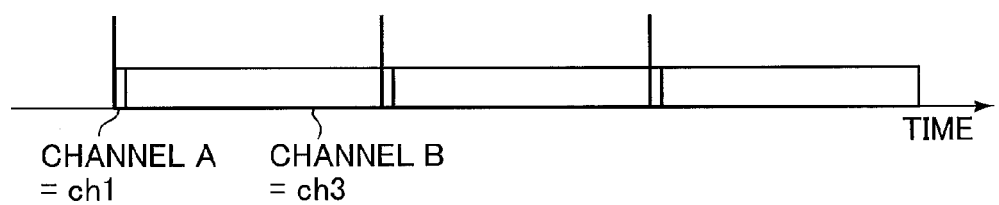

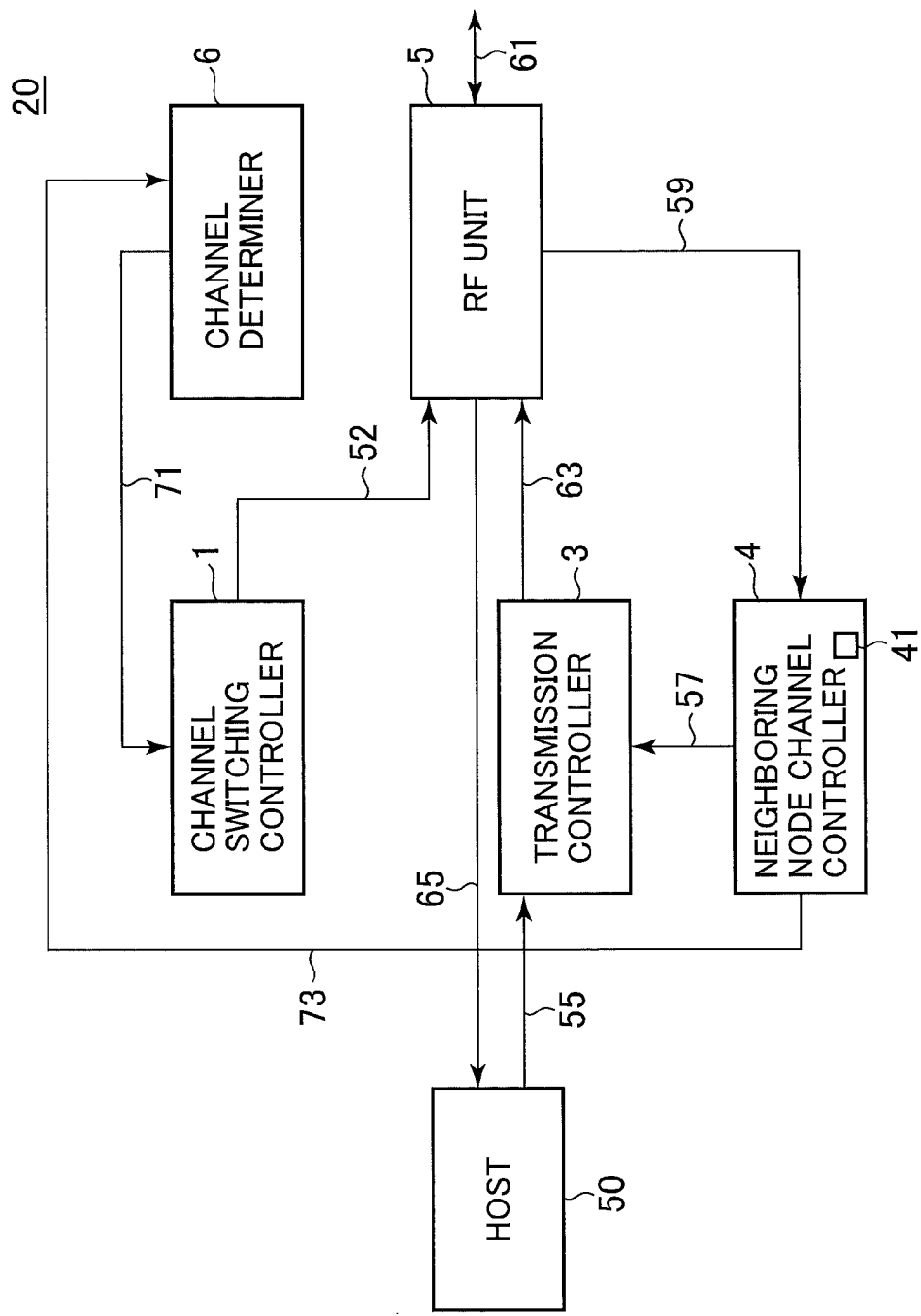

COMMUNICATIONS APPARATUS TRANSMITTING DATA ON CHANNELS ADAPTIVELY SWITCHABLE

BACKGROUND OF THE INVENTION

1. Field of the Invention

The present invention relates to a communications apparatus, and more specifically to a communications apparatus applicable to a telecommunications network, such as a sensor network, formed by plural communications node devices spatially distributed to perform wireless data communication therebetween.

2. Description of the Background Art

In recent years, a type of wireless network is demanded in which plural communications channels, or multi-channels, are available to wireless terminals to carry out multiple, simultaneous communications over the different channels.

IEEE (Institute of Electrical and Electronics Engineers) 802.11 DCF (Distributed Coordination Function), an existing standardized system widely applied as a conventional channel access solution in wireless networks, uses a single wireless channel to be shared between neighbor terminals, which may access the channel at random to conduct data communication. In that system, the wireless terminals are thus allowed to use one channel at a time to transmit frames.

A communication method which permits wireless terminals to use several channels is presented by Yosuke Tanigawa, et al., "Multi-Channel MAC Protocols Pursuing Aggressive Use of Vacant Resources", The Institute of Electronics, Information and Communication Engineers (IEICE), 2009, IEICE Transactions B, vol. J92-B, No. 1, pp. 196 to 206.

In the method described in Yosuke Tanigawa, et al., one control channel and multiple data channels are provided, and in the standby mode the control channel is normally used for waiting reception. A source node, when attempting data transmission, uses the control channel to send out a control packet which includes information about which channel it intends to use for the data transmission. A destination node, when having received the control packet, acknowledges a receipt of the control packet in order and then switches its channel in use to the designated data channel. Upon receipt of the acknowledgement, the source node can transmit data over the data channel. When the transmission is terminated, both of the source and destination nodes switch back to the control channel to wait for reception over the control channel.

The above procedure allows the nodes to use several channels for communication, thereby reducing radio interference to thereby improve throughput over the system. Moreover, Yosuke Tanigawa, et al., is advantageous in that temporal synchronization may not be established between the nodes.

The solution by Yosuke Tanigawa, et al., however, requires a source node to run a reservation sequence, prior to data transmission, for informing a destination node of a data channel to be used for communication. Such a reservation sequence must be performed for each packet transmission. That raises a problem that increasing overhead is not a little in comparison to a case where only data is directly transmitted without running the reservation sequence.

SUMMARY OF THE INVENTION

It is an object of the present invention to provide a communications apparatus that can more efficiently perform communication over multiple channels. It is a more specific object to provide a communications apparatus that can reduce the radio interference and hence improve the throughput, without relying on temporal synchronization, so as to reduce possible overhead which would be caused by channel reservations.

In accordance with the present invention, a communications apparatus for use in one node forming a telecommunications network together with at least one other node comprises: a communication controller transmitting or receiving a signal on any of a plurality of channels; a channel switching controller operative in response to channel switching information selectively defining a plurality of reception-waiting periods using the plurality of channels to alter a channel to be used by the communication controller; a channel switching information supplier supplying the channel switching information of the one node to the at least one other node; a channel switching information manager receiving channel switching information from the at least one other node via the communication controller to manage the received channel switching information; and a transmission controller referring, when transmitting a transmission signal, to the channel switching information managed by the channel switching information manager to search for one of the plurality of channels which is used in a destination node, and controlling repetitive transmission of the transmission signal on the one channel searched for.

Also in accordance with the present invention, the telecommunications network is formed by a plurality of node devices, each of which comprises the communications apparatus.

Further in accordance with the present invention, a non-transitory computer-readable storage medium storing a communications program for use in a computer provided in the one node is provided, in which the program controls the computer to serve as the communications apparatus.

By employing the above configurations, the present invention have advantages that, without premising on temporal synchronization, the radio interference can be reduced and the throughput is improved, whereby possible overhead due to channel reservations can be reduced and efficient communication over a plurality of channels can be implemented.

BRIEF DESCRIPTION OF THE DRAWINGS

The objects and features of the present invention will become more apparent from consideration of the following detailed description taken in conjunction with the accompanying drawings in which:

FIG. 4 schematically shows an example of reception-waiting channel table according to the embodiment;

FIG. 5A schematically shows a telecommunications network for use in describing an operation of communication processing according to the embodiment;

FIGS. 5B and 5C are schematic time charts useful for understanding the operation of communication processing according to the embodiment;

FIG. 8 is a schematic block diagram, like FIG. 1, showing the functional constitution of a communication controller of a node according to an alternative preferred embodiment of the invention;

DESCRIPTION OF THE PREFERRED EMBODIMENTS

Now, a preferred embodiment of a communications apparatus of the present invention will be described in detail with reference to the accompanying drawings. The instant embodiment is advantageously applicable to, for instance, a multi-hop telecommunications network, such as a sensor network, formed by a plurality of communication node devices 10, FIG. 2, spatially distributed to allow the node devices 10 to perform data communication in an ad-hoc mode.

First, reference will be made to FIG. 2, which is a schematic block diagram showing the internal configuration of the node device 10 according to the illustrative embodiment. The node device may also be referred to simply as "node". In the embodiment, the node devices 10 constituting the multi-hop network may have the same internal configuration as each other.

Figure 2:
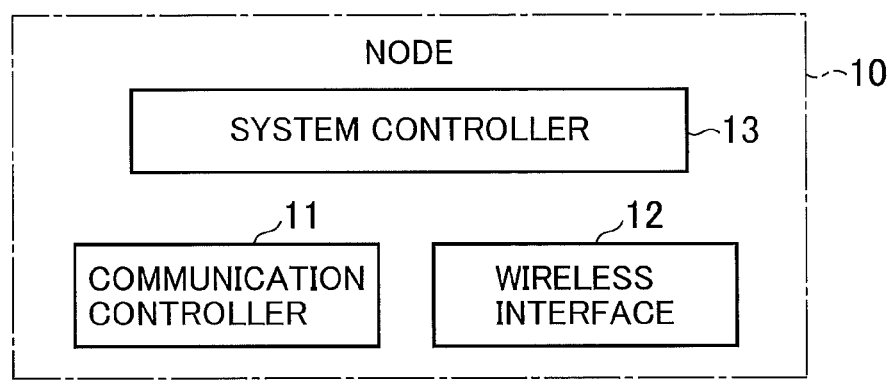
FIG. 2 is a schematic block diagram showing the internal configuration of a node device of the preferred embodiment shown in FIG. 1.

As seen from FIG. 2, the node device 10 of the illustrative embodiment comprises a system controller 13, a communication controller 11 and a wireless interface 12.

The system controller 13 is adapted for controlling the various functions of the entire node 10, and may be implemented by a processor system. By way of example, the system controller 13 may consist of a CPU (Central Processing Unit), ROM (Read Only Memory), RAM (Random Access Memory), EEPROM (Electrically Erasable Programmable Read-Only Memory), I/O (Input-Output) interface and the like, not shown.

The communication controller 11 is another processor adapted for controlling communication processing of the node 10. The communication controller 11 may consist of such a CPU, ROM, RAM, EEPROM, I/O interface and the like, also not shown. The functions of the communication controller 11 may be implemented by the CPU, when carrying out processing program sequences stored in the ROM, for example. The functions of the communication controller 11 may include, e.g. control of data packet transmission/reception, channel control, routing control. The details on these functions will be described later.

The wireless interface 12 has an antenna and a wireless communication processor, not shown, to establish a wireless communication function. The wireless interface 12 may be a radio transmitter and receiver, by way of example. Each node 10 contains one wireless interface 12.

Figure 1:
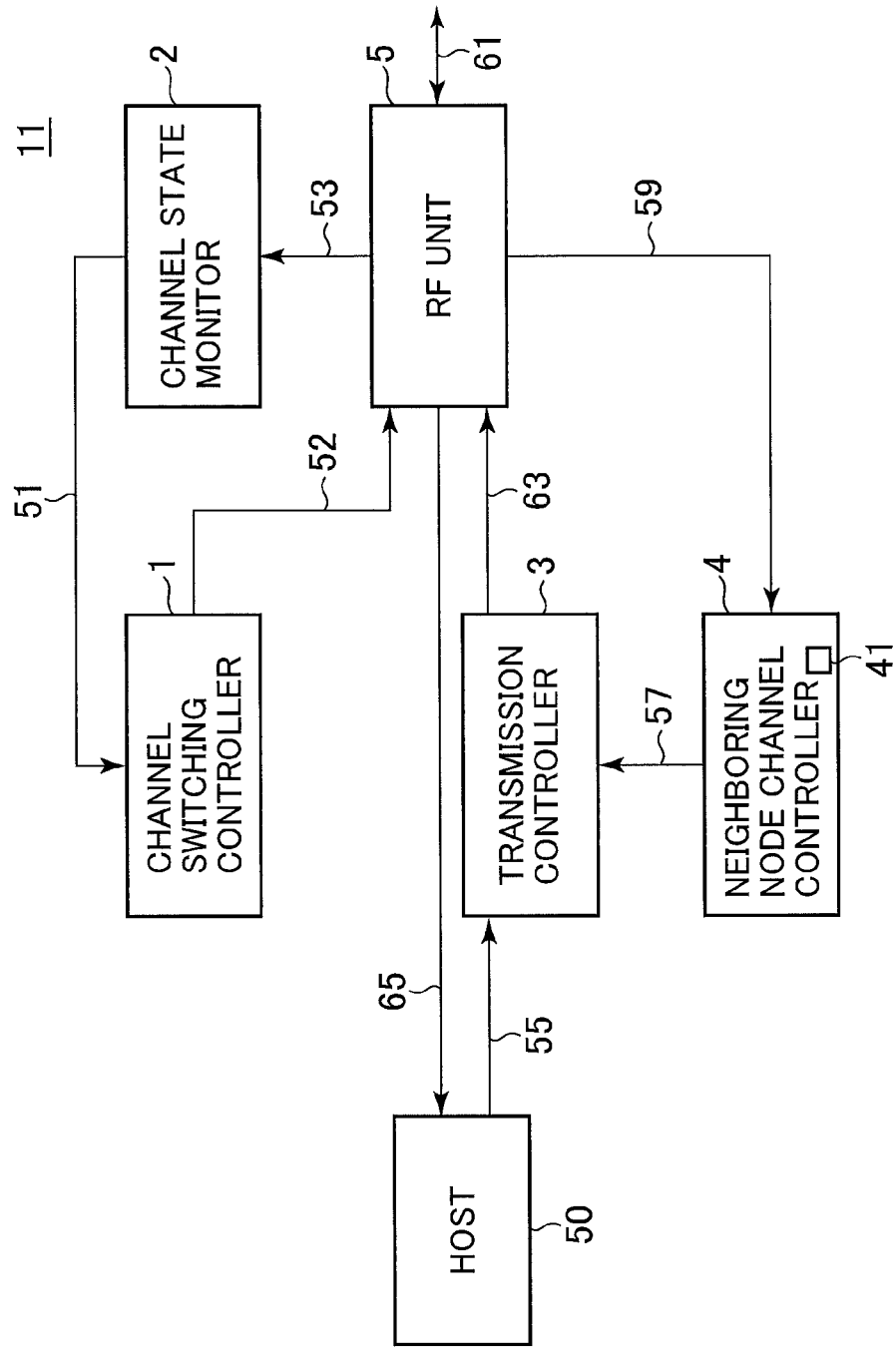
FIG. 1 is a schematic block diagram showing the functional constitution of a communication controller according to a preferred embodiment of the invention.

Now, reference will be made to FIG. 1, which is a schematic block diagram showing the functional constitution of the communication controller 11 of the illustrative embodiment. The communication controller 11 includes as its functional subsections a channel switching controller 1, a channel state monitor 2, a transmission controller 3, a neighboring node channel controller 4 and an RF (Radio Frequency) unit 5, which are interconnected as illustrated.

The channel switching controller 1 is adapted to manage channels waiting for reception in the RF unit 5. The channel switching controller 1 has a channel schedule to be used for selecting or switching the channels in the RF unit 5.

A receiving channel schedule is broadcast from a node 10 to its neighboring nodes 10. Each node 10, when having received the receiving channel schedule, is thus informed of the channel schedules of its neighboring nodes while transmitting its own channel schedule to its neighboring nodes.

Figure 3:
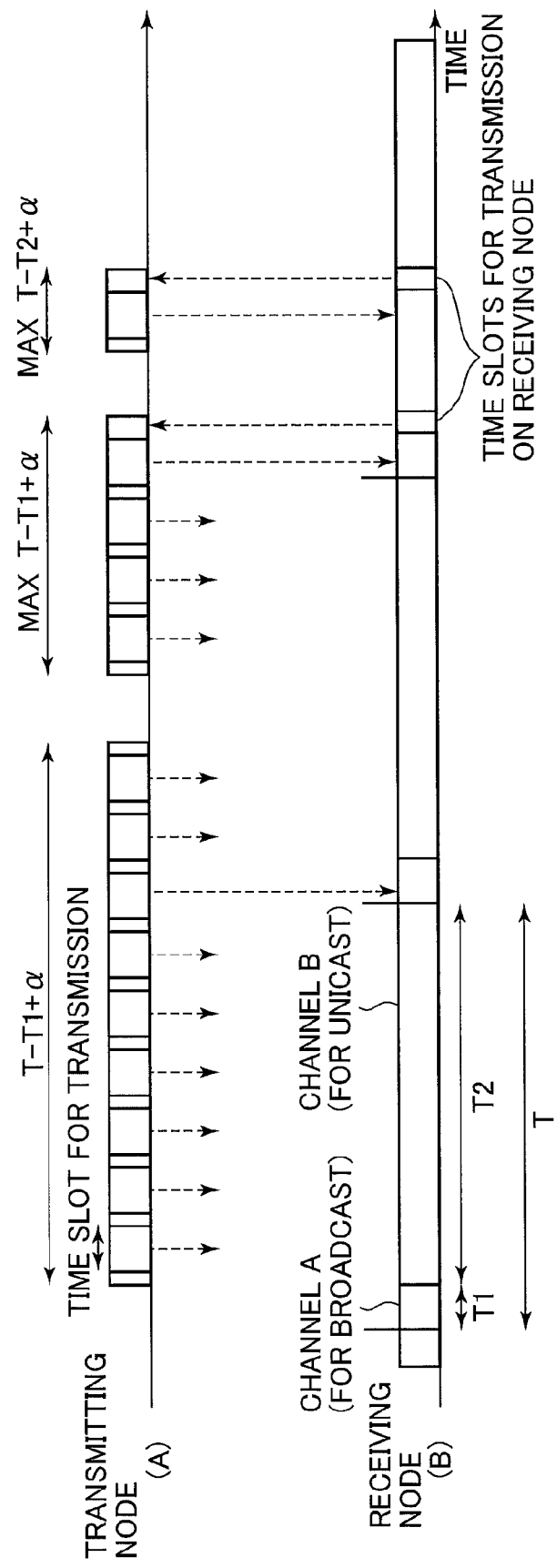
FIG. 3 is a schematic time chart useful for understanding transmission and reception operations executed by nodes according to the embodiment.

FIG. 3 is a schematic time chart of transmission and reception operations performed by the node 10. The line (B) of FIG. 3 shows an example of reception operation conducted by the channel switching controller 1 of a receiving node. On the line (B), a channel schedule has its general cycle T [sec] set, the cycle being repeated. The duration of the general cycle T may be common to all the nodes 10 throughout the network system.

In the channel schedule, the general cycle T has its common channel reception-waiting period, or "channel A", and a non-common channel reception-waiting period, or "channel B". The channel A has its channel number common to the nodes 11 throughout the network. The channel B has its channel number each node arbitrarily assigns. For example, on the line (B), the channels A and B have the periods thereof set to T1 and T2 [sec], respectively. In addition, the period T1 of the channel A is uniform in duration throughout all the nodes in the network.

Since the channel A is for common use in the network, it may be used to transmit packets needed to be sent to all nodes, e.g. control packets in relation to routing. For the channel B, it may be sufficient to have its channel number uniquely recognizable by the nodes on the network. The channel B may be used to transmit packets between the nodes, e.g. in a unicast fashion.

In this way, the channel schedule defines the length of the period and the channel number of the channel A to be used as well as the length of the period and the channel number of the channel B to be used for. The channel switching controller 1 selects the channel number to be used in the RF unit 5 according to the channel schedule.

The channel switching controller 1 is adapted to receive a notification 51 of a channel state or condition from the channel state monitor 2 to refer to an updated channel number to be used on the channel B, contained in the notification 51, thus altering the channel schedule accordingly. Signals or information are designated with reference numerals of connections conveying the signals or information.

If the channel schedule is renewed or altered, the channel switching controller 1 provides the RF unit 5 with information 52 on the altered channel schedule so as to broadcast the renewed schedule to the neighboring nodes. In this way, the nodes 10 can always be provided with the latest channel schedule.

When the altered channel schedule is broadcast, the entire channel schedule including the channel number of the channel A may be sent, or only the updated channel number to be used on the channel B may be sent. If only the updated channel number to be used on the channel B is sent, the size of transmitted data can be decreased, thereby achieving the reduction in data bandwidth.

For example, in a system of frequency hopping spread spectrum, a channel is also switched according to schedule. The channel switching solution according to the illustrative embodiment is however different from that of the frequency hopping spread spectrum in terms of the following point. In the frequency hopping spread spectrum, the schedules must be synchronized between a transmitting and a receiving end when establishing communication. By contrast, the channel switching solution of this embodiment does not require the synchronization of the channel schedule. That is to say, each node can change the channel number in its own timing.

The channel state monitor 2 is configured to receive channel state information 53 of a channel used as the channel B and monitor the channel state of the channel in question based on the channel state information 53.

To the channel state monitor 2, any methods for monitoring the channel state may be applied so far as they can confirm the state or condition of use of a channel in use. As an example, the channel state monitor 2 may be adapted to use the frequency of transmission errors of packets transmitted over the channel B in the RF unit 5 or the frequency of transmission failures resultant from the RF unit 5 having sensed a carrier occupied prior to transmitting packets to thereby estimate congestion of the channel in use.

In addition to that, the channel state monitor 2 is configured to make a determination on whether or not the channel is well used, and change the channel number if the channel is not well used to send the notification 51 of the updated channel state including the altered channel number to the channel switching controller 1.

For instance, when the frequency of packet transmission errors having occurred on the channel B or the frequency of occurrence of transmission failures caused by a carrier being sensed as occupied exceeds a predetermined threshold value, the channel state monitor 2 changes the channel number to be used on the channel B. In this case, the monitor 2 may choose a channel randomly from available channels, or scan alternative channel candidates and verify their state in use so as to set an available channel to be an alternative channel.

The transmission controller 3 is adapted to be responsive to a packet 55 transferred from its host or client device 50, such as a personal computer, connected to the node device 11 to refer to the channel schedules of the neighboring nodes which are managed by the neighboring node channel controller 4 to control the transmission of the packets on a channel having its number corresponding to the channel waiting for reception which is assigned to a destination node. That is symbolically depicted with an interconnection 57 in FIG. 1. Where the network 61 is applied to a sensor network, the host device 50 may be connected to a sensor, not shown.

Furthermore, the transmission controller 3 is adapted for controlling the transmission depending on the types of packets to be sent. By way of example, the transmission controller 3 determines how to transmit packets, i.e. transmit them over the channel A or B in a broadcast or unicast fashion, so as to control the transmission operation based on the determination result.

Now, the transmission processing performed by the transmission controller 3 will be described with reference to FIG. 3, of which the line (A) shows the transmission operation carried out by the transmission controller 3 of a transmitting node.

FIG. 3, line (A), illustrates an example in which a control packet, e.g. routing control packet or control packet containing a channel schedule, is transmitted over the channel A, and a data packet containing user data is transmitted over the channel B. In addition, the control packet can be transmitted in a broadcast or unicast fashion, whereas the data packet is transmitted in a unicast fashion. The above-described rule of transmission control can be implemented by setting in advance information associated with the packet types in the transmission controller 3.

In FIG. 3, a reference code A-1 denotes the case of a packet which should be transmitted over the channel A as with, e.g. a control packet and has its destination address indicating a broadcast address. In this case, the transmission controller 3 has a time slot in which the own node 10, where the communication controller 3 is installed, transmits a packet. Thus, the transmission controller 3 controls the transmission such that packets are continuously sent out during a period $T-T1+\alpha$ [sec], where the value $\alpha$ is a fixed value that can be set experimentally. The period $T-T1+\alpha$ is defined such as to make the continuous transmission of packets from the transmitting node overlap at least once with the reception-waiting period of the channel A on the receiving node.

A reference code A-2 in FIG. 3 denotes another case where a packet should be sent over the channel A and its destination address is a unicast address. In this case, the transmission controller 3 continuously transmits packets until it receives a response packet from the receiving node. If the transmission controller 3 cannot receive a response packet from the receiving node in a period $T-T1+\alpha$ [sec] elapsing since the transmission began, the transmission controller 3 ceases the transmission, and that is a transmission failure.

A reference code A-3 in FIG. 3 indicates that a packet should be transmitted over the channel B as with the case of transmitting, e.g. user data. Although the transmission is also continuously carried out in this case, the transmission controller 3 controls the transmission time to be run out at a period $T-T2+\alpha$ [sec] having elapsed since the transmission began to thereby terminate the transmission.

As shown in FIG. 3, in regard to the lengths of the periods of channels A and B, there is a huge difference between them. Thus, a value of the period $T-T2+\alpha$ may sometimes be remarkably small. In that case, the transmission controller 3 is set such that, even when the time duration for continuously transmitting packets over the channel B is shorter than the time duration for transmitting one packet, packets may necessarily be sent out once or twice.

Returning to FIG. 1, the neighboring node channel controller 4 is adapted for organizing the channel schedules of the neighboring nodes. The neighboring node channel controller 4 has a reception-waiting channel table 41, and upon receipt of the channel schedules from the neighboring nodes, sets or updates the items in the reception-waiting channel table 41, as is conceptually depicted with an interconnection 59.

FIG. 4 is a schematic diagram showing a structural example of the reception-waiting channel table 41. In this figure, the table 41 includes the fields of, for instance, "Node" for recording identifications for identifying the neighboring nodes, e.g. address information such as MAC (Media Access Control) address, and "Channel B" for recording channel numbers of reception-waiting channels set as the channel B of the corresponding neighboring nodes. By way of example, FIG. 4 illustrates that a node presented in the identification field as "Node 1" has a channel number "ch1" in the field "Channel B" of a waiting channel as the channel B.

In FIG. 4, since the channel A uses a common channel number in the illustrative embodiment, only the channel numbers as the channel B are stored, as is not limitative. The channel numbers as the channel A may additionally be stored.

The RF unit 5 is adapted to switch or alter the channel number for transmission or reception to transmit or receive packets to or from the network 61. The RF unit 5 sends out packets 61 under the control of the transmission controller 3 as depicted with an interconnection 63.

The RF unit 5 is also adapted for selectively switching the channel number to be used for waiting reception under the control of the channel switching controller 1 so as to receive incoming packets. Upon receipt of packets 61, the RF unit 5 transfers the received packets 65 to the host device 50. Moreover, the RF unit 5 has, for instance, the functions of sensing carriers on the CSMA/CA (Carrier Sense Multiple Access with Collision Detection) rules and evaluating communication performance, e.g. analyzing the frequency of transmission errors, thereby providing the channel state monitor 2 with the channel state information 53 on the reception-waiting channels.

Now, an operation of communication processing in the embodiment will be described by referring to further figures of the accompanying drawings. FIGS. 5A, 5B and 5C are useful for understanding the operation of communication processing in the illustrative embodiment. In FIG. 5A, circles denote the nodes 10 and arrows denote radio links.

In the initial state, the channel schedules of all nodes 10 may be assumed to have the same settings for simplicity, but not restrictive in practice such that those nodes 10 may have different channel schedules from each other.

As an example, FIG. 5B illustrates that the channel schedule of the channel A is set to "ch1" while the channel schedule of the channel B is set to "ch2". In addition, the length of the period T1 of the channel A may be set to T1=2 ms and the length of the period T2 of the channel B is set to T2=198 ms. Furthermore, the ratio between the period lengths of the channels A and B may be the same throughout the entire nodes 10.

Figure 6:
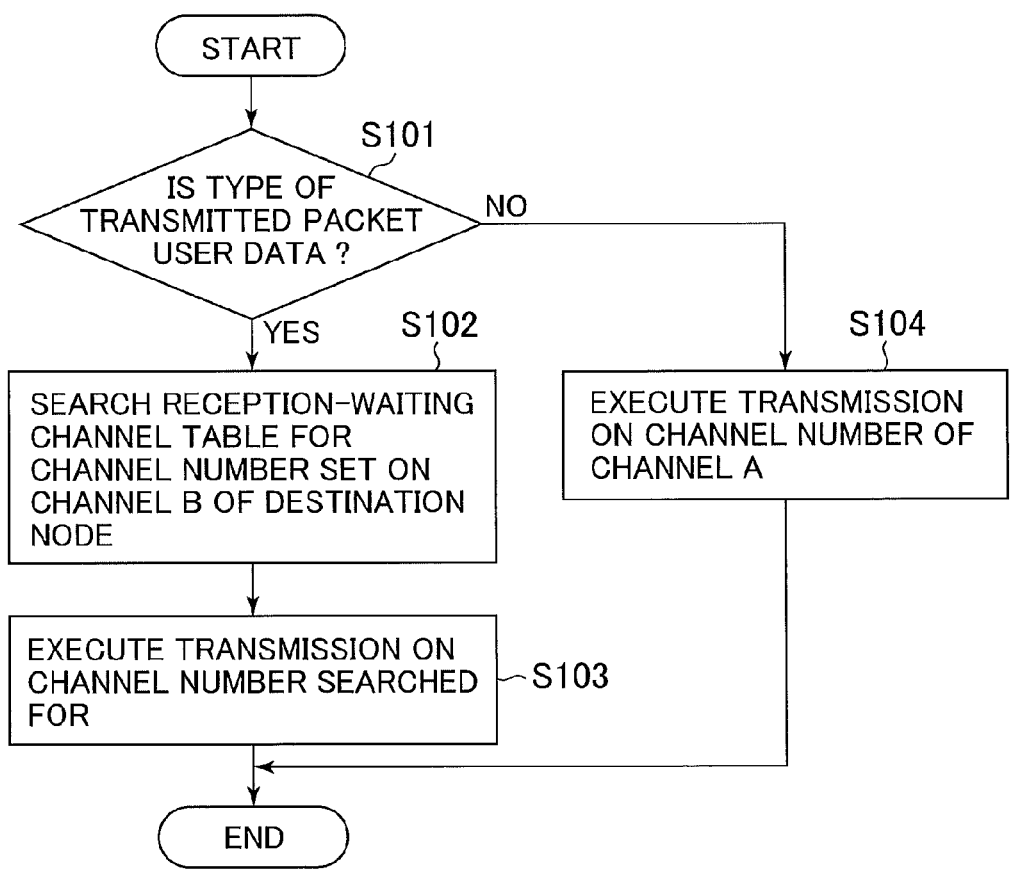
FIG. 6 is a flowchart useful for understanding an operation of packet transmission carried out by the nodes according to the embodiment.

FIG. 6 is a flowchart for use in describing the operation of processing of packet transmission in a node 10. At the initial stage, each node 10 does not have the channel schedules of the other nodes set therein. Thus, each node 10 broadcasts its own channel schedule to the other nodes.

In FIG. 6, step S101 checks whether or not a packet 55 to be transmitted is a control packet. In the current example, it is a control packet containing the channel schedule of the node 10 intended to be transmitted on the channel A and hence its destination address indicative of a broadcast address. Hence, the transmission controller 3 uses the channel number "ch1" of the channel A to broadcast the packet to the most neighboring nodes 10 (step S104).

In this case, the transmission controller 3 continues to transmit the control packet repeatedly during a period T−T1+α=198+α [ms]. Consequently, a receiving node 10 can receive the packet at reception-waiting timing of 2 ms on the channel A.

In the receiving node 10, the channel schedule of the transmitting node contained in the received packet is supplied to the neighboring node channel controller 4. The neighboring node channel controller 4 uses the channel schedule of the transmitting node thus obtained to produce the reception-waiting channel table 41.

Then, each node 10 sends out a routing control packet in order to set up routing over the network 61. As to the routing, the type of algorithm to be used may not be limited but various types of algorithm can be used. For example, AODV (Ad-hoc On-demand Distance Vector), OLSR (Optimized Link State Routing) and DSR (Dynamic Source Routing) algorithms may be applied.

In FIG. 6, since the routing control packet has to be transmitted on the channel A (step S101), the transmission controller 3 transmits the packet to the most neighboring nodes on the channel number "ch1" of the channel A in a broadcast or unicast fashion (step S104).

When the routing is completed, each node 10 becomes able to transmit a data packet including user data. In this example, the data packet will be transmitted in the unicast fashion.

In order that the node 10 transmits the data packet containing the user data (step S101), the transmission controller 3 proceeds to step S102 to use the channel B.

In step S102, the transmission controller 3 obtains address information on a destination node of the data packet. The controller 3 in turn searches the reception-waiting channel table 41 in the neighboring node channel controller 4 for the channel number "ch2" of the channel B corresponding to the address information on the destination node (step S102).

In this stage, the channel number of the channel B of all the nodes 10 is set to "ch2". Thus, the transmission controller 3 utilizes the channel "ch2" to send out the data packet toward the destination node (step S103). In this case, the transmission controller 3 tries to transmit the data packet continuously during the period of T−T2+α [ms].

Now, assuming that an interference source region 31 arises on the network 61 as shown in FIG. 5A. In this figure, shaded circles denote nodes which come under the influence of the interference source region 31.

In the nodes 10 residing within the interference source region 31, the interference source region 31 exerts an effect on the RF unit 5, leading to, for instance, the occurrence of an error in data packet transmission, or increase in erroneous detection of carrier as occupied through the carrier sense conducted before the transmission to conclude that the channel is busy, and thereby the possibility of failure of data transmission will be increased.

Figure 7:
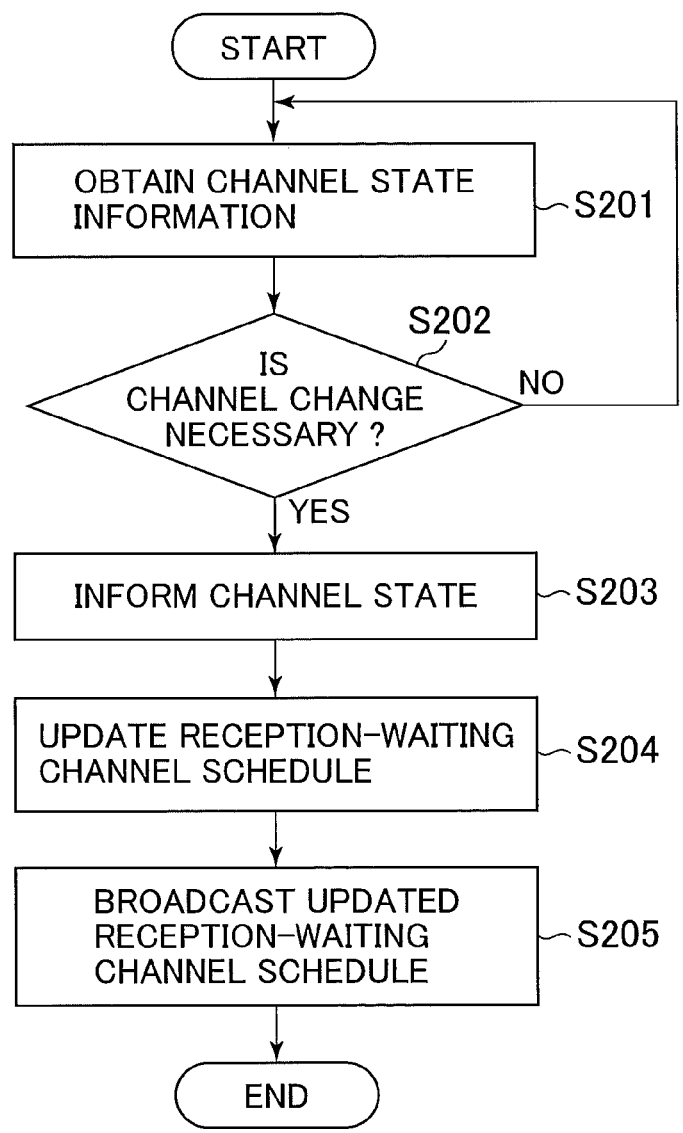
FIG. 7 is a flowchart useful for understanding an operation of altering a channel schedule according to the embodiment.

FIG. 7 is a flowchart for use in understanding an operation of altering a channel schedule. In the nodes 10 lying in the interference source region 31, the channel state monitor 2 derives channel state information 53, FIG. 1, from the RF unit 5 (step S201), and on the basis of the obtained information 53, makes a determination on whether or not the channel in question is favorably used (step S202).

When the determination result shows the necessity of channel change, the channel state monitor 2 informs the channel switching controller 1 about the channel state 51 including the altered channel number (step S203).

Upon receipt of the altered channel number from the channel state monitor 2, the channel switching controller 1 sets the channel number of the channel B to the received channel number, thereby updating the channel schedule (step S204).

After the update of the channel schedule, the channel switching controller 1 broadcasts the updated channel schedule to the most neighboring nodes over the channel A (step S205). The broadcast of the updated channel schedule may be processed in the same manner as the channel schedule done at the initial stage.

By way of example, a node 10 within the interference source region 31 in FIG. 5A alters the channel number of the channel B from "ch2" to "ch3" as illustrated in FIG. 5C. In another node 10, when having received the altered channel schedule, its neighboring node channel controller 4 updates the channel number of the channel B of the transmitting node in question from "ch2" to "ch3". Consequently, the data communication between the nodes existing in the interference source region 31 over the channel B will be carried out through the channel number "ch3".

In this way, the nodes 10 within the interference source region 31 may change the channel number of the channel B. Accordingly, all nodes will use the channel number of "ch1" for the channel A as shown in FIGS. 5B and 5C. Concerning the channel B, the nodes 10 outlying the interference source region 31 may use the channel number "ch2", whereas the nodes 10 lying in the source region 31 may use the number "ch3". As a consequence, the failure of transmission due to interference will be overcome.

In the above example, the channel state monitor 2 is adapted for selecting an appropriate channel. Alternatively, the channel state monitor 2 may not be adapted for selecting an appropriate channel but periodically changing the channel number of the channel B to a random number. That is, so far as a node 10 does not keep on using only one channel number on the channel B, the interference will be avoided from the statistical point of view.

In summary, the communications apparatus in accordance with the illustrative embodiment described above waits for reception while changing or switching the receiving channels, performs repetitive transmission in different periods depending on the reception-waiting channels of the transmitting node, and exchanges the schedules of channel switching between the neighboring nodes, thereby establishing a multi-hop network managed by using a plurality of channels, although conventionally managed by using a single channel, throughout the entire network.

In addition to that, there is no need to run a sequence of channel reservation for each packet transmission, which was required in the earlier-described Yosuke Tanigawa, et al., so that overhead can be reduced. As a result, even when an interference source arises, it is sufficient to alter a specific channel only lying in the interference region.

Furthermore, even when a large amount of data packets flows across the network so that a resultant packet traffic jam causes the failure in packet transmissions, the channels can be changed by conducting the operation similar to that for avoiding an interference source described above. Thus, the packet traffic can be dispersed across several channels, so that the capacity of the network can be increased.

Next, an alternative embodiment of the communications apparatus of the invention will be described with reference to other figures of the accompanying drawings. The alternative embodiment is also an example of applying the present invention to a multi-hop network as with the illustrative embodiment shown in and described with reference to FIG. 1.

The alternative embodiment may basically be applied to the node structure 10 shown in and described with reference to FIG. 2. The alternative embodiment may be the same as the first embodiment except for the way of routing over a network by means of a tree routing protocol, and the functions of the communication controller 11 of the nodes 10.

The alternative embodiment is further different in that a reference node, or "root", in a network tree has a plurality of wireless interfaces. The root may be any node that can be a standard. For instance, the root may be one residing on the top of the network tree, or one lying somewhere on the downstream from the top of the network tree when organized into a hierarchical structure.

FIG. 8 is a schematic block diagram showing the functional structure of a communication controller 20 of the node 10 in the instant alternative embodiment. In the figure, the communication controller 20 may comprise a channel determiner 6 in addition to the channel switching controller 1, transmission controller 3, neighboring node channel controller 4 and RF unit 5. The channel determiner 6 is provided in place of the channel state monitor 2 of the first embodiment and interconnected as illustrated. Like components are designated with the same reference numerals throughout the application.

The channel determiner 6 is adapted to refer to the reception-waiting channel table 41 stored in the neighboring node channel controller 4 to decide a channel number used in the channel B of a mother node to be assigned to the channel B of the own node 10 in which the communication controller 20 is installed. When the channel determiner 6 decides the channel number of the channel B of the own node 10, the channel determiner 6 informs the decided number 71 to the channel switching controller 1.

In this context, the "mother node" is a node that locates closer in a network tree by a one-hop distance to the root than the node in question does. More specifically, if the root is the top node, the mother node locates higher in hierarchy by a one-hop distance than the node concerned.

When a network routing tree is built based on a tree routing protocol, the mother node supplies the neighboring node channel controller 4 with a channel schedule, and the controller 4 in turn utilizes the channel schedule of the mother node thus received to produce the reception-waiting channel table 41.

Then, the channel determiner 6 refers to the produced reception-waiting channel table 41 to decide the channel number set in the channel B of the mother node to be used for the channel number of the channel B of its own node.

A node directly communicating with the root may have its channel schedule set out directly by its mother node, i.e. root, to decide the channel schedule.

Figure 9A:
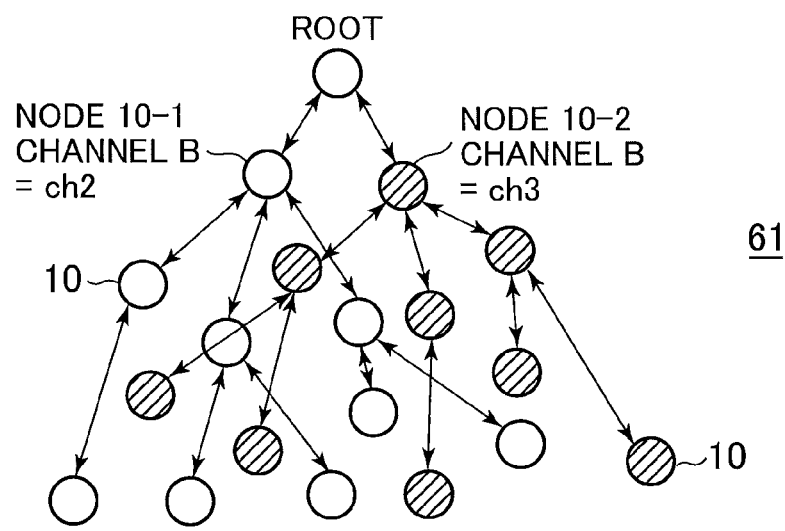
FIG. 9A schematically shows, like FIG. 5A, a telecommunications network for use in describing an operation of communication processing according to the alternative embodiment.
Figure 9B:
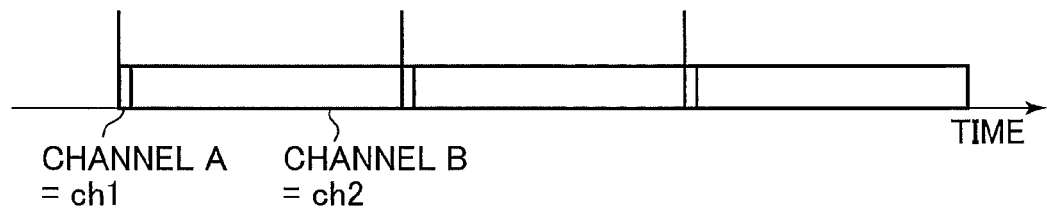
FIGS. 9B and 9C are schematic time charts, like FIGS. 5B and 5C, useful for understanding an operation of communication processing according to the alternative embodiment.
Figure 9C:
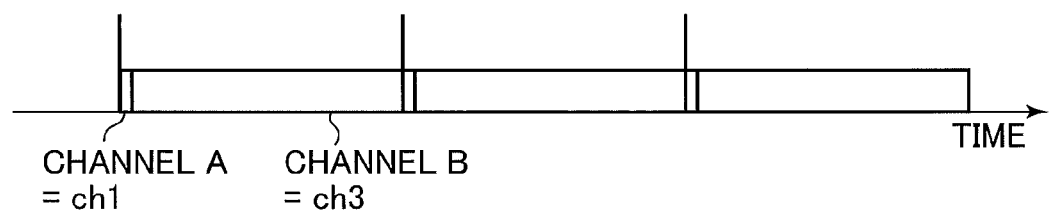
Figure 10:
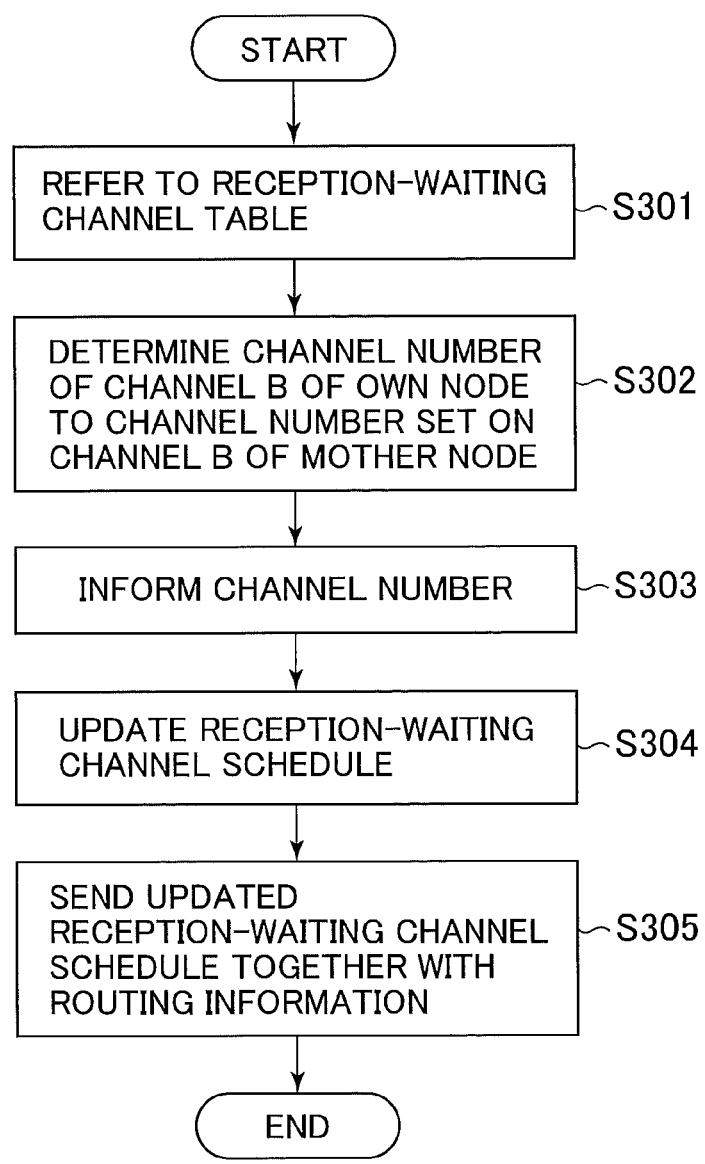
FIG. 10 is a flowchart useful for understanding an operation of altering a channel schedule according to the alternative embodiment.

FIG. 9A schematically shows a telecommunications network 61 and FIGS. 9B and 9C are time charts for use in describing the operation of communication processing in the alternative embodiment. FIG. 10 is a flowchart for use in describing the operation of altering the channel schedule in the alternative embodiment.

In FIG. 9A, circles represent the nodes 10 and arrows denote radio links. In the initial state, the channel schedules of all nodes 10 may be assumed to have the same settings for simplicity, but restrictive in practice so that the nodes 10 may have channel schedules different from one another.

As illustrated in FIG. 9B, the channel schedule in this alternative embodiment may be assumed that it has the same setting as the first embodiment, that is, the channel numbers of channels A and B are set to "ch1" and "ch2", respectively. It may further be assumed that, as with the first embodiment, the length of the period T1 of the channel A is set to 2 ms, and the length of the period T2 of the channel B is set to 198 ms. Moreover, the ratio in length of the periods between the channels A and B. may be the same throughout the entire nodes 10.

An initialized channel schedule is broadcast to the most neighboring nodes in the same manner as the first embodiment.

As may be the case with the alternative embodiment also, the network 61 may be built in the form of tree-type routing structure based on the tree routing protocol. That is to say, when a tree routing algorithm is applied in building up a network tree, the routing starts to be established firstly from node/nodes nearest to a root, which is located at the highest level of the tree. The tree routing protocol can be of any kinds as long as they can implement tree routing. For example, an AODV algorithm, a DSR algorithm and the similar can be adapted.

The root may include a couple of wireless interfaces, for instance. Thus, the root naturally has the channel schedules respectively associated with both wireless interfaces.

When establishing a network tree, the root sends out a routing control packet carrying routing information.

A node 10 locating at a distance of one hop from the root forms a route to the root. For the routing, this node 10 gets a channel schedule from the root.

Upon receipt of the channel schedule from the root, the neighboring node channel controller 4 of the node 10 in question utilizes the received channel schedule 59 to produce the reception-waiting channel table 41, FIG. 8.

With reference to FIG. 10, the channel determiner 6 of the node 10 refers to the reception-waiting channel table 41 (step S301) to decide the channel number set on the channel B of the root to be used for the channel number of the channel B of its own node in which the node 10 is installed (step S302). The channel number thus decided is transferred to the channel number determiner 6 as indicated with a connection 73 in FIG. 8.

After the channel number of the channel B of the node is decided by the channel determiner 6, the channel number 71 is informed to the channel switching controller 1 (step S303). The channel switching controller 1 in turn is allowed to change the channel schedule of the node 10 so that the channel number of the channel B of the own node 10 is altered to be that of the mother node (step S304).

In this case, the root assigns the channel numbers to the plurality of nodes 20 such that each node 10 has the channel number different from one another. In addition, the root defines the channels of the wireless interfaces allotted to those nodes 20 such as to be the channel numbers of the channels B for the couple of wireless interfaces. Specifically, as seen from FIG. 9A, at a distance of one hop from the root, there exist two nodes 10-1 and 10-2 in this example. In this case, the root assigns the channel number "ch2" to the channel B of the node 10-1 while assigning the number "ch3" to the channel B of the node 10-2. The root defines the channels "ch2" and "ch3" to be used on the channels of its own wireless interfaces.

The nodes 10-1 and 10-2 then send out their channel schedules accompanied by routing information to other nodes (step S305).

When nodes 20 locating downstream by a one-hop distance from the nodes 10-1 and 10-2 receive the routing information, they produce the respective routes based on the routing information. In those nodes 20 downstream by one hop, the neighboring node channel controller 4 uses the channel schedules 59 supplied together with the routing information to produce the reception-waiting channel table 41.

Then, the channel determiner 6 of the downstream nodes 20 sets the channel number of the channel B thereof to the channel number of the channel B of the mother node according to the procedure presented in FIG. 10. The channel switching controller 1 in turn updates the channel schedule of the downstream nodes 20.

The above-described series of steps are repeated in the same way. Thence, on one hand, a network tree consisting of the nodes depicted with open circles in FIG. 9A will be established where the channel B of each node has the channel number "ch2", and, on the other hand, another network tree consisting of the nodes depicted with shaded circles will be established where the channel B of each node has the channel number "ch3". In other words, there will be established a telecommunications network 61 including network trees having different channel schedules from each other.

In the network tree in which the node 10-1 is the highest node in hierarchy, when the nodes intend to transmit data packets via the channel B, they use the channel number "ch2" for transmission. In contrast thereto, when the nodes in the other network tree, in which the node 10-2 is the highest node in hierarchy, intend to transmit data packets over the channel B, they use the cannel number "ch3". Consequently, the radio waves transmitted over the network 16 can be prevented from interfering with each other between both network trees.

Moreover, since the root defines the channel numbers of the channel B of both wireless interfaces to be the respective channels "ch2" and "ch3", the root can receive data simultaneously from the nodes 10-1 and 10-2.

The instant alternative embodiment includes the single root. Alternatively, it may include two or more roots arranged.

Furthermore, the root in the alternative embodiment is the highest-order node in hierarchy. However, a node located downstream from the highest-order node may have the same configuration as such a root. That allows the sub-networkt rees to operate in such a way that the channel numbers are different between those sub-network trees.

In addition, the communication controller of the nodes 10 may comprise both of the channel determiner 6 and the channel state monitor 2. In that case, a priority may be set on either of the channel determiner 6 and the channel state monitor 2 so as to be simultaneously active in the corresponding priority order.

In short, the alternative embodiment has an advantage, in addition to the advantage of the first embodiment, that different channels can be assigned to each of trees on a network. By thus using several channels, the reduction of interference can be expected. Specifically in a tree-type network, traffic may generally become heaviest particularly around a root. However, the alternative embodiment makes it possible to establish simultaneous communications by plural nodes with the root on the several channels, thus the capacity of the network being increased.

Next, another alternative embodiment of the communications apparatus of the present invention will be described in reference to FIG. 11 of the accompanying drawings. This alternative embodiment may also be applied to a multi-hop network as with the first embodiment shown in and described with reference to FIG. 1. The instant alternative embodiment is essentially applicable also to the node structure 10 shown in FIG. 2.

Figure 11:
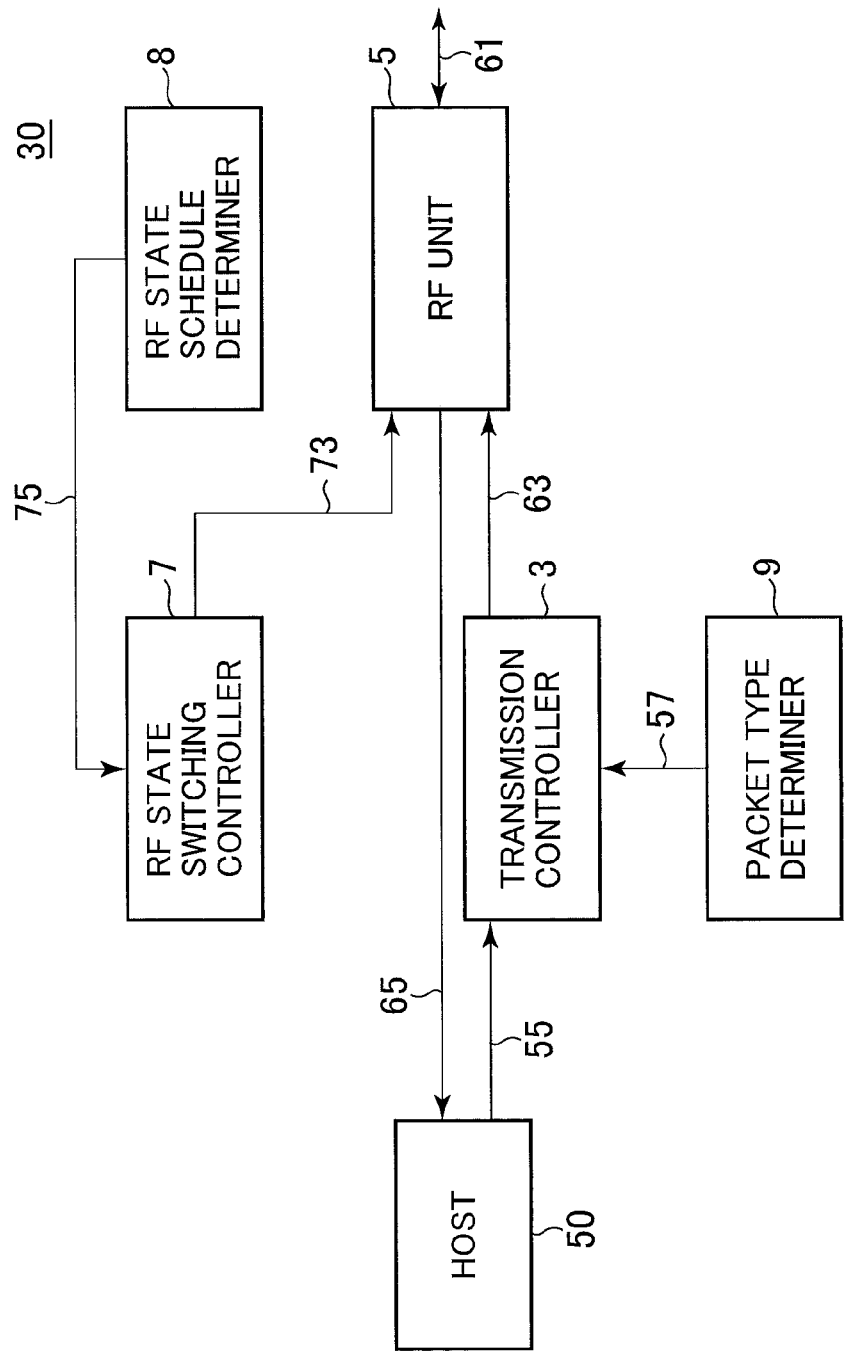
FIG. 11 is a schematic block diagram, like FIG. 1, showing the functional constitution of a communication controller of anode according to another alternative preferred embodiment of the invention.

FIG. 11 is a schematic block diagram showing the functional structure of a communication controller 30 of the nodes 10 in the present alternative embodiment. The communication controller 30 may include, in addition to the communication controller 3 and the RF unit 5, an RF state switching controller 7, an RF state schedule determiner 8 and a packet type determiner 9, which are connected to each other as illustrated.

The present alternative, third embodiment may basically be the same as the first embodiment except for having the RF state switching controller 7 instead of the channel switching controller 1, the RF state schedule determiner 8 instead of the channel state monitor 2, and the packet type determiner 9 instead of the neighboring node channel controller 4.

The RF state switching controller 7 is configured to use the channel schedule 75 of a reception-waiting channel decided by the RF state schedule determiner 8 to switch or change the channel of the RF unit 5. Furthermore, the RF state switching controller 7 executes sleep control on the RF unit 5 based on the channel schedule 75 decided by the RF state schedule determiner 8. The channel switch instruction and sleep control are symbolically depicted with a connection 77 in FIG. 11.

Figure 12:
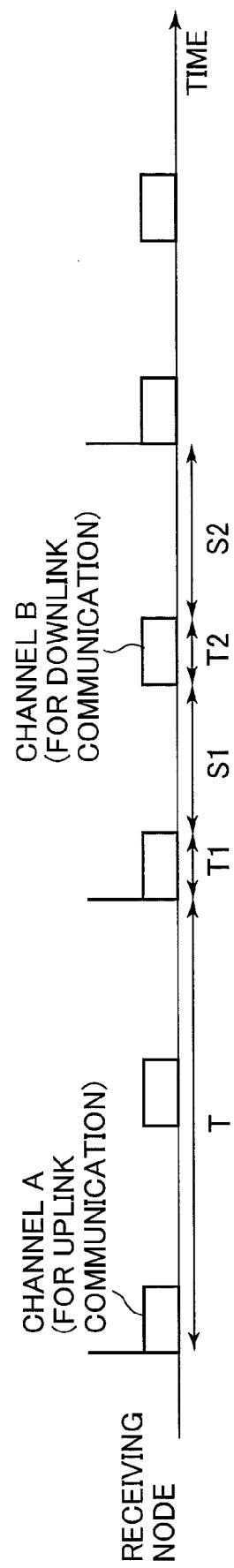
FIG. 12 is a schematic time chart useful for understanding a reception operation performed by an RF state switching controller according to the other alternative embodiment.

FIG. 12 is a schematic time chart for use in describing a reception operation conducted by the RF state switching controller 7. As seen from the figure, the total period T [sec] contains a couple of reception-waiting periods: one using a channel number for an uplink, e.g. channel A, and having its period length T1 [sec], and the other using another channel number for a downlink, e.g. channel B, and having its period length T2 [sec]. The RF state switching controller 7 sets sleep periods S1 and S2 respectively between the channels A and B and between the channel B and a subsequent channel A. The sleep periods are provided in order to temporarily halt waiting a reception in the period.

The RF state schedule determiner 8 is adapted for deciding a channel schedule 75 of the own node 10, on which the schedule determiner 8 is installed, on the basis of transmission and reception timing of its mother node. More specifically, the RF state schedule determiner 8 decides the reception-waiting period of the channels A and B as well as the sleep periods provided between the channels A and B and also between the channel B and the subsequent channel A.

The RF state schedule determiner 8 retains routing information obtained by routing control and thus knows information on the number of hops from the root to the own node 10 where the determiner 8 is installed and identification data of the mother node. On the basis of the above information and the transmission and reception timing in the mother node, the RF state schedule determiner 8 defines the channel schedule 75.

The RF state schedule determiner 8 decides the channel schedule 75 of its own node 20 such that a delay in multi-hop transmission is reduced depending on a used network topology. The procedure of deciding a channel schedule will be described in detail later on in connection with the operation of communication processing.

By way of example, the RF state schedule determiner 8 may be adapted to define timing on the channel A of its own node based on the timing of reception wait of the mother node and to decide a sleep period between the channels A and B in adaptive to the network topology.

The packet type determiner 9 is adapted for making a determination on what type of packet is to be transmitted, i.e. an uplink frame or downlink frame, and informing, based on the determination result, a channel to be used for transmission to the transmission controller 3, as depicted with the connection 57 in FIG. 11. The uplink frame is intended for use in transmission in a direction getting on toward the root, and the downlink frame is adapted for use in transmission in a direction getting away from the root.

The packet type determiner 9 may determine uplink and downlink frames by using any suitable methods. For instance, the transmission frames may include an identifier indicative of an uplink or downlink frame, by which the packet type determiner 9 can determine which type of the frames they are. Alternatively, the determiner 9 may store routing information acquired by routing control, and refer to a destination address of a frame to be transmitted for determining whether the frame is uplink or downlink. By way of example, the determiner 9 may keep the number of hops from the root for each neighboring node to compare it with the number of hops from the root to the own node on which the determiner 9 is installed, so that it is determined that, if the comparison reveals the number of hops of a transmission relay decreasing, the frame is of uplink, and if increasing, the frame is of downlink.

The transmission controller 3 is adapted for controlling an operation of packet transmission based on the result of the determination 57 made by the packet type determiner 9. More specifically, the transmission controller 3 sends out an uplink packet by using the channel number of the channel A while sending a downlink packet using the channel number of the channel B.

Although the node 10 of the present alternative embodiment does not include the neighboring node channel controller 4 of the first embodiment, it may be provided with the neighboring node channel controller 4 such as to hold the channel schedules of the neighboring nodes.

Now, the operation of communication proceeding according to the third embodiment will be described by referring further to FIG. 13 of the drawings. It is assumed merely for description that initially the same channel numbers of channels A and channel B are respectively set to "ch1" and "ch2" throughout all nodes 10 in the network 61.

Each node 10 sends out a routing control packet to establish a network connection. It is to be noted that the type of algorithm for use in routing may not be limitative, but various types of algorithm can be used. For example, AODV, OLSR and DSR algorithms may be applied. Once the routing is completed and the network connection is built, each node 10 can transmit data packets.

Figure 13:
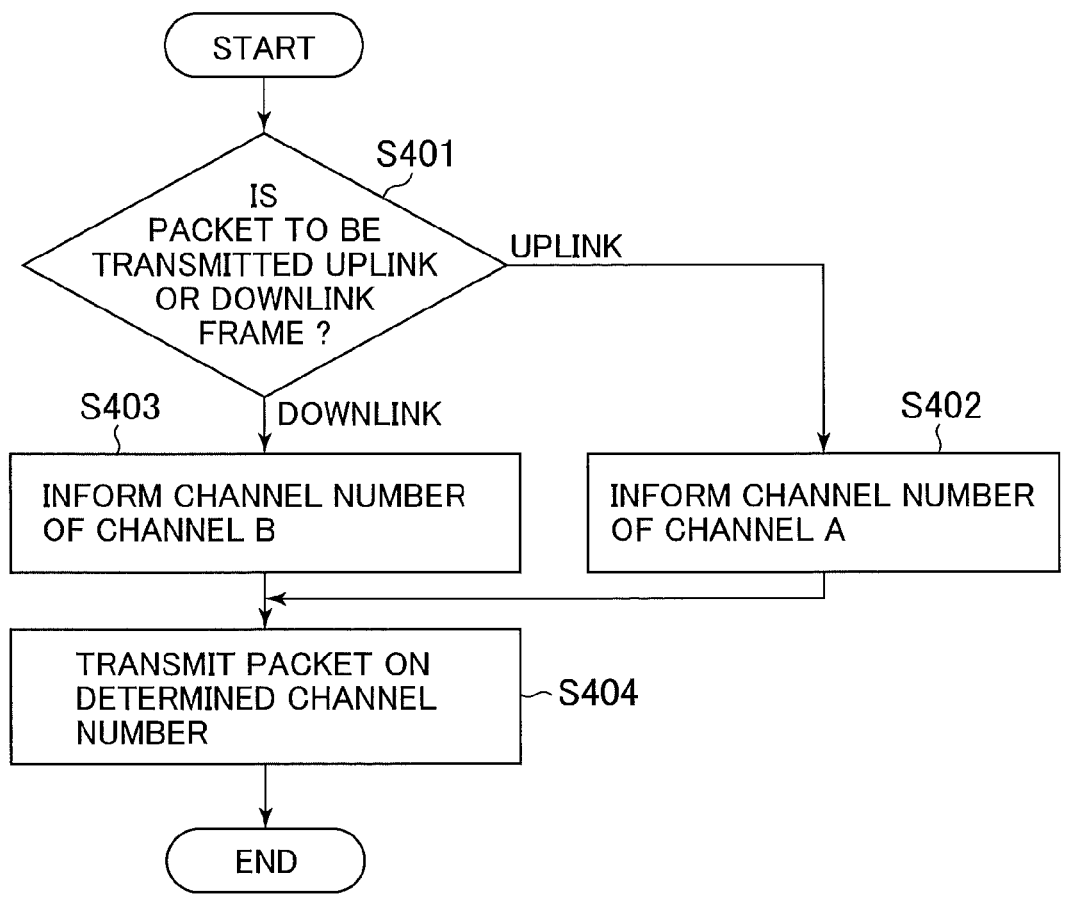
FIG. 13 is a flowchart useful for understanding an operation of packet transmission conducted by nodes according to the other alternative embodiment.

FIG. 13 is a flowchart of the operation of packet transmission carried out in the nodes 10. When the transmission controller 3 is supplied with a packet 55 to be sent, the packet type determiner 9 makes a determination on whether the packet is of an uplink or downlink frame (step S401). If the packet is determined as an uplink frame, the packet type determiner 9 informs the transmission controller 3 of the channel number "ch1" of the channel A (step S402). When the packet is of a downlink frame, the determiner 9 informs the controller 3 of the number "ch2" of the channel B (step S403). The transmission controller 3 uses the channel number 57 informed by the packet type determiner 9 to allow that packet to be transmitted (step S404).

Figure 14:
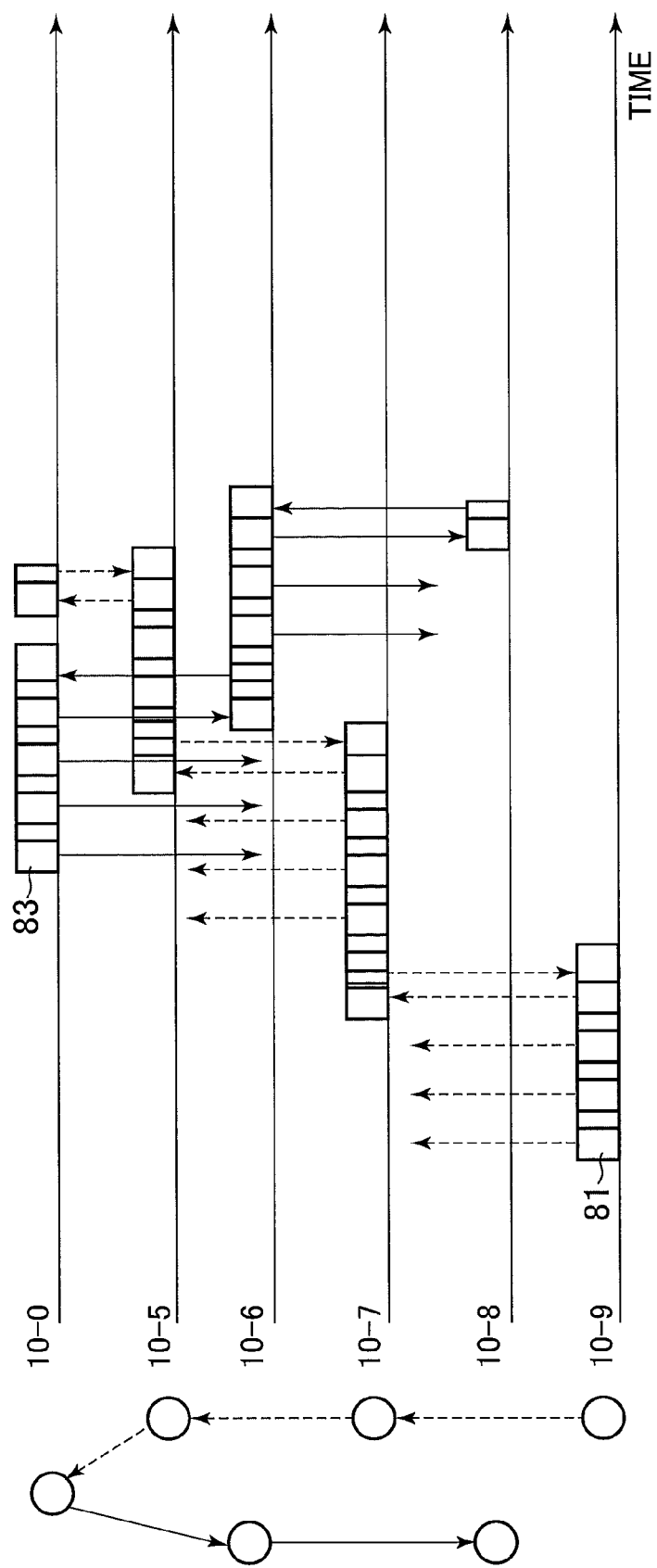
FIG. 14 is a schematic time chart useful for understanding communication processing according to the other alternative embodiment.

FIG. 14 is a schematic time chart for use in describing the communication operation executed in the current alternative embodiment. FIG. 14 presents a situation in which a node 10-9 originates an uplink communication toward a node 10-0, i.e. root, and immediately thereafter the node 10-0 originates a downlink communication toward a node 10-8. In this figure, the uplink and downlink communications are denoted with dashed lines with arrow and solid lines with arrow, respectively.

Packets 81 transmitted from the node 10-9, namely uplink frames, are relayed through nodes 10-7 and 10-5 to the node 10-0, whereas packets 83 from the node 10-0, namely downlink frames, are relayed through a node 10-6 to a node 10-8.

As can be seen from FIG. 14, the transmission of the packets 81 from the node 10-7, or uplink frames, and the transmission of the packets 83 from the node 10-0, downlink frames, take place substantially simultaneously. Nonetheless, since the uplink transmission uses the channel "ch1" while the downlink transmission uses the channel "ch2", i.e. both transmissions use different channels, there arises no radio interference between the uplink and downlink transmissions. Thus, the nodes 10-5 and 10-6 can respectively receive the uplink packets 81 from the node 10-7 and the downlink packets 83 from the node 10-0 without any problems.

Figure 15:
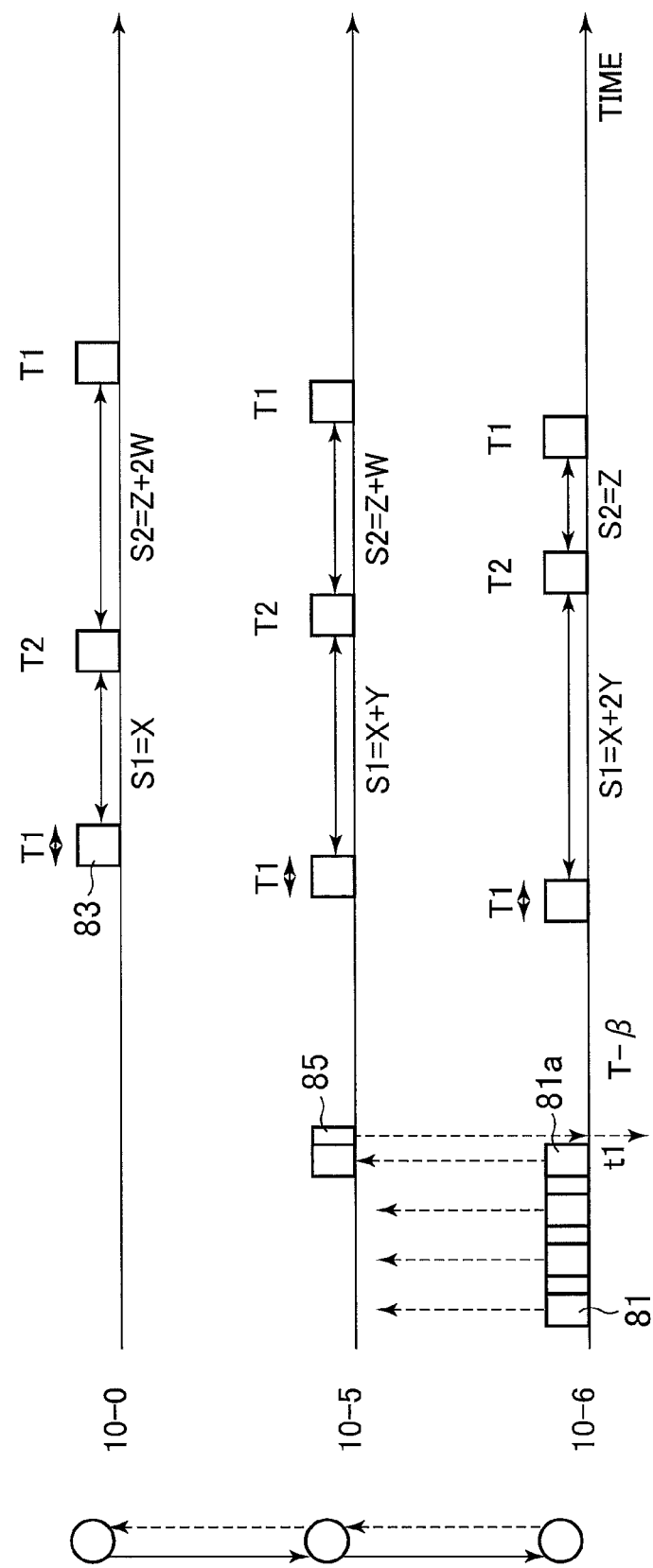
FIG. 15 is a schematic time chart useful for understanding how to determine a channel schedule according to the other alternative embodiment.

FIG. 15 is also a schematic time chart for use in describing how to decide the channel schedule in accordance with the third embodiment. As shown in the figure, the packets 81 transmitted from the node 10-6, i.e. uplink frames, are relayed via the nodes 10-6, 10-5 and 10-0 in this order, whereas the packets 83 from the node 10-0, i.e. downlink frames, are relayed via the nodes 10-0, 10-5 and 10-6 in this order. In this figure, the uplink and downlink communications are denoted with dashed lines with arrow and solid lines with arrow, respectively.

Figure 16:
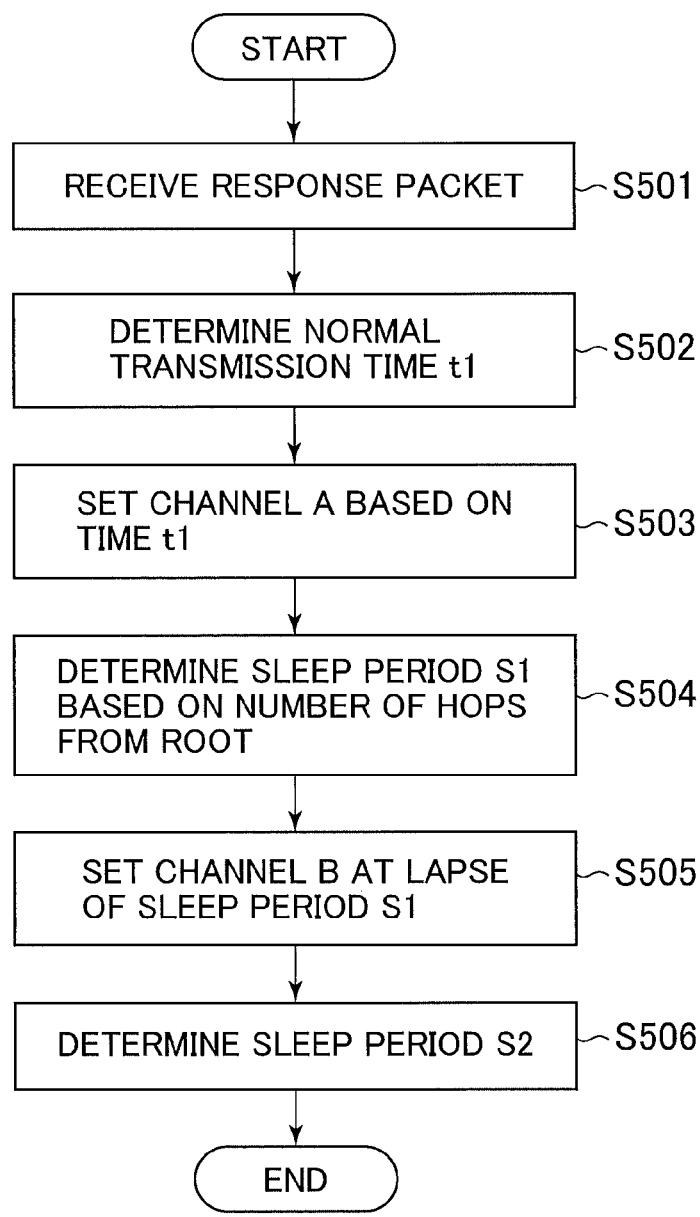
FIG. 16 is a flowchart useful for understanding a procedure for determining the channel schedule according to the other alternative embodiment.

FIG. 16 is a flowchart of the processing of deciding a channel schedule according to the third embodiment.

When a packet 81 of uplink frame to be transmitted is generated in the node 10-6 as shown in FIG. 15, the transmission controller 3 of the node 10-6 uses the channel "ch1" of the channel A to transmit the packet 81 to the node 10-5, i.e. mother node.

When the channel A of the node 10-5 is in its reception-waiting state, the node 10-5 uses the channel "ch1" to receive the transmitted packet 81. The node 10-5 then sends a response packet 85 to the node 10-6 over the channel "ch1".

The node 10-6 receives the response packet 85 from the node 10-5 on the channel "ch1" of the channel A (step S501).

Upon receipt of the response packet 85 from the mother node 10-5, the RF state schedule determiner 8 of the node 10-6 defines the time at which the transmission to the node 10-5 was successful as a normal transmission time t1 (step S502).

It is to be noted that the timing at which the response packet 85 was received corresponds to the reception timing on the channel A of the mother node. Thus, the RF state schedule determiner 8 can recognize the timing on the channel A of the mother node by receiving the response packet 85.

As described above, in the instant alternative embodiment, the normal transmission time t1 is defined as the time when the node 10-6 transmits the last packet 81a, as depicted in FIG. 15. Alternatively, the time t1 can be defined as the time when the response packet 85 is received.

The RF state schedule determiner 8 of the node 10-6 sets the channel A of its own when a period of time has lapsed with respect to the normal transmission time t1 (step S503). The period of time may be approximately shorter than the period T by a predetermined time.

In the above process, the RF state schedule determiner 8 adjusts the timing of reception-waiting on the channel A of the node 10-6 in such a way that the timing of reception-waiting on the channel A of the node 10-6 comes right before the timing of reception-waiting set on the channel A of the mother node. That renders the timing of the channel A of the node 10-6 immediately preceding the timing of the channel A of the mother node. Hence, even when the node 10-6 transmits uplink packets 81 to its mother node repetitively over a shorter period of time, the node 10-6 will possibly receive a response packet 85. That will cause packets to be transmitted in a shorter period, thereby the load on network bandwidth being reduced. Thus, the length of the period of repetitive packet transmission can be shortened, and furthermore the length of the period for reception waiting on the channel A can also be shortened.

As shown in FIG. 15, for instance, the RF state schedule determiner 8 adjusts time to initiate the channel A of the node 10-6 when a time T-β has lapsed since the normal transmission time t1. The value β can be defined on an experimental basis.

The RF state schedule determiner 8 subsequently determines time depending on the number of hops from the root, or node 10-0, as the sleep period S1 based on the normal transmission time t1 (step S504). Consequently, the repetitive transmission time on the downlink as well as the reception-waiting period of the channel B can be shortened.

FIG. 15 shows the sleep time S1 in the node 10-0 is X seconds. From the root, or node 10-0, the nodes 10-6 and 10-5 are distant by two and one hops, respectively. In this case, the RF state schedule determiner 8 of the node 10-6 defines the sleep period S1 of the node 10-6 to be equal to X+2Y seconds. The RF state schedule determiner 8 of the node 10-5 defines the sleep period S1 of the node 10-5 to be equal to X+Y seconds. In this way, the schedule determiner 8 of each node may define the sleep period S1 to be equal to a fixed value plus a value proportionate to the number of hops.

The RF state schedule determiner 8 of the node 10-6 sets the channel B of its own when the sleep period S1 lapses (step S505). Subsequently, the RF state schedule determiner 8 defines a sleep period T2 staring when the period of reception-waiting period on the channel B lapsed and continuing until the time period T elapses (step S506).

The RF state schedule determiner 8 operates in the way described above to attain the temporal relationship as illustrated in FIG. 15 such that, when the sleep period T2 of the node 10-6 is equal to Z seconds, for example, the sleep periods T2 of the nodes 10-5 and 10-0 are equal to Z+W seconds and Z+2W seconds, respectively.

As a consequence, the timing of waiting for reception on the channel B for downlink packets 83 can be set to come immediately after the timing of the channel B of the mother node, whereas the timing of waiting for reception on the channel A for uplink packets 81 comes right before the timing of the channel A of the mother node.

Thus, when the node 10-0 transmits the downlink packets 85 to the node 10-6 and end nodes in turn try to transmit response packets to the node 10-0, the nodes can reduce the operation time required for repetitively transmitting the packets to catch the timing of reception-waiting set in a destination node.

In summary, according to the instant alternative embodiment, the packet communication can be carried out over channels that are different between the uplink and the downlink, so that no collision occurs between the uplink and downlink traffic, and thereby packet loss can be minimized.

In addition to that, the instant alternative embodiment allows the nodes to go into sleep as well as to switch channels, so that electric power can be saved.

Furthermore, the alternative embodiment may set the sleep period S1 of the RF state schedule based on the number of hops from the root to a node of interest. That will decrease the delay in packet transfer and the electric power required for repetitive transmission.

In the above illustrative embodiments, different channel numbers are used to define two channels A and B as reception-waiting periods, but three or more reception-waiting periods can be set. The periods of the channels A and B may be fixed or variable in length. The channel numbers to be used in the channels A and B may also be changed at regular intervals or random.

The entire disclosure of Japanese patent application No. 2011-206303 filed on Sep. 21, 2011, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communications apparatus for use in one node of a telecommunications network that includes the node and at least one other node, the communications apparatus comprising:
   a communication controller, having
      a CPU (central processing unit), and
      a storage medium having program instructions store thereon, execute of which by the CPU causes the communication controller
         to maintain channel switching information, and, operative in response to the channel switching information, selectively define a plurality of reception-waiting periods for the plurality of channels,
         to supply the channel switching information of the one node to the at least one other node,
         to receive channel switching information of the at least one other node from the at least one other node and manage the received channel switching information; and
         to, when transmitting a transmission signal, refer to the received channel switching information of the at least one other node, to select one of the plurality of channels assigned to a destination node of the transmission signal, and to control repetitive transmission of the transmission signal on the one selected channel, and
         to select ones of the channels to be used during the reception-waiting periods carried by the channel switching information of the one node, including setting one of the plurality of reception-waiting periods on a fixed channel for use in common to the one node and the at least on other node, and setting the remaining reception-waiting periods on ones of the channels that are locally selectable in the one node.

2. The apparatus in accordance with claim 1, wherein said setting the remaining reception-waiting periods includes randomly selecting channels for the remaining reception-waiting periods.

3. The apparatus in accordance with claim 1, wherein said setting the remaining reception-waiting periods includes setting the remaining reception-waiting periods based on a state of communication in said telecommunications network.

4. The apparatus in accordance with claim 1, wherein said setting the remaining reception-waiting periods includes setting the remaining reception-waiting periods on the one channel assigned to the destination node.

* * * * *